FIG I

United States Patent Office 2,791,739
Patented May 7, 1957

2,791,739

CIRCUIT ARRANGEMENT FOR CONVERTING A LOWER D. C. VOLTAGE INTO A HIGHER D. C. VOLTAGE

Leon Henry Light, Tooting, London, England, assignor, by mesne assignments, to North American Philips Company, Inc., New York, N. Y., a corporation of Delaware Application May 20, 1955, Serial No. 509,894

Claims priority, application Great Britain May 20, 1954

11 Claims. (Cl. 321—2)

The present invention relates to circuit arrangements for converting a lower D. C. voltage into a higher D. C. voltage. More particularly, the invention relates to circuit arrangements for converting a lower D. C. voltage into a higher D. C. voltage by means of a transistor-oscillator, comprising rectifying and filtering means for rectifying the oscillator-oscillations.

It has been proposed, to use a transistor in a relaxation oscillator-circuit, in which the emitter is connected to one terminal, for example the positive terminal, of a source of voltage, e. g. a battery, and the collector is connected via the primary winding of a transformer to the other terminal of said source, while the base is connected via the secondary winding of the transformer in series with a resistor to the emitter. In this manner, negative voltage impulses are produced in the primary winding of the transformer when the transistor cuts itself off. The amplitude of said impulses may be many times the magnitude of the voltage of said voltage source. The voltage impulses are supplied through a rectifier to a load circuit which may comprise smoothing means. This circuit arrangement suffers from a limitation in that the voltage generated across the load varies if the load impedance and/or the voltage of the transistor supply varies.

The present invention has for its object to mitigate said disadvantages and has the feature that the rectified oscillator-oscillations, after comparison with a reference voltage, control the base current of the transistor so as to establish a predetermined relationship between said rectified oscillations and the reference voltage.

The invention may more particularly be used for producing a stabilized output voltage, viz. if the reference voltage is a constant voltage independent of the supply voltage.

The circuit arrangement in accordance with the invention, may alternatively be employed as an amplifier, in which case the reference voltage is varied in accordance with a signal to be amplified, so that the rectified oscillations also vary in accordance with said signal.

In order that the invention may be readily carried into effect, it will now be described with reference to the accompanying drawings, given by way of example, in which.

Figure 1:
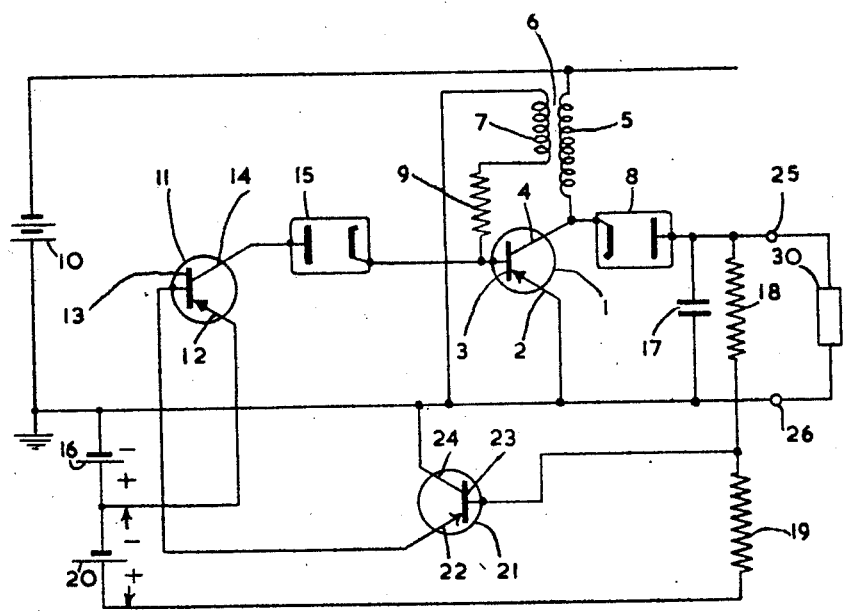
Fig. 1 is a schematic diagram of an embodiment of the circuit arrangement of the present invention.

The circuit arrangement shown in Fig. 1 comprises a transistor 1 of pnp type which is connected as an oscillator. Its emitter 2 is connected to a point of constant potential, for example ground, and its collector 4 is connected through the primary winding 5 of a transformer 6 to the negative terminal of a D. C. voltage supply 10 of, for example, 3 volts, and is connected through a rectifier 8 to a smoothing capacitor 17, with which two series-connected resistors 18 and 19 are connected in parallel.

The base 3 of transistor 1 is grounded through a resistor 9 in series with a secondary winding 7 of the transformer 6. Furthermore, the base 3 is connected through a rectifier 15 to the collector 14 of a transistor 11, the emitter 12 of which is connected to the negative terminal of a reference supply 20, of for example, 1.5 volts, and to the positive terminal of an auxiliary supply 16 of, for example, 1.5 volts. The negative terminal of the supply 16 is connected to ground. The base 13 of transistor 11 is directly connected to the emitter 22 of a transistor 21, the collector 24 of which is grounded, while its base 23 is connected to the junction of the resistors 18 and 19. The free end of resistor 19 is connected to the positive terminal of the reference supply 20. A load 30 is connected between terminals 25 and 26.

In the circuit arrangement of Fig. 1, the transistor 1 produces voltage impulses which are rectified by means of the rectifier 8, the D. C. voltage thus obtained being supplied to the load 30. When the voltage of the supply 10 is applied to the collector 4 of the transistor 1, the transistor 1 becomes conductive and an increasing current passes through the winding 5, which current induces a negative voltage on the secondary winding 7 connected to the base 3, with the result that there remains only a very small voltage difference between the collector 4 and the emitter 2. Thus, substantially the whole voltage of the supply 10 is applied across the self-inductance of the winding 5. That is, the current through the winding 5 increases substantially linearly. This current induces a substantially constant D. C. voltage on the secondary winding 7, so that a substantially constant base current flows through the transistor 1.

These conditions hold good until the collector current of the transistor 1 cannot rise any further and the voltage across the winding 7 decreases. The base current then decreases abruptly, whereby, at the same time the collector current is compelled to decrease, thus producing in the winding 7 a voltage which is positive with respect to ground, by which voltage the transistor 1 is blocked. On account of interruption of the current through the primary winding 5, a high negative voltage is set up at the collector 4. This voltage persists until interruption of the current supplied via the rectifier 8 to the smoothing filters 17, 18, 19 across which a negative voltage is produced, the transistor 1 subsequently becoming conductive again and the oscillation cycle being repeated.

Such an oscillator suffers from the disadvantage that the direct voltage set up between the terminals 25 and 26 depends on the value of the load 30. As a matter of fact, the energy supplied by the oscillator is substantially constant at a constant value of the base current, which is substantially determined by the voltage across the winding 7 and the value of resistor 9.

In accordance with the invention means are provided for stabilizing the voltage between the terminals 25 and 26 by which means the energy supplied by the oscillator is made to vary according to the value of the load 30. To this end the base 3 of transistor 1 is connected via a rectifier 15 to the collector 14 of a transistor 11, which connection constitutes a variable shunt over the base-emitter input resistance of transistor 1, by means of which shunt the base current of transistor 1 can be varied. The rectifier 15 prevents the voltage peaks of the oscillator from reaching the collector electrode 14, whereby the transistor 11 is controlled by transistor 21 in grounded collector-connection, the base 23 of which is connected to the potentiometers 18, 19 so that a part of the output voltage is applied to the base 23.

The emitter 22 has substantially the same potential as the base 23 and this potential is compared with the potential of, for example, 1.5 volts of the emitter 12 of transistor 11, the base 13 of which is connected to the emitter 22. The current flowing from the base 3 to the collector 14 depends upon the result of said comparison.

Thus, in effect, the part of the output voltage across the resistor 19 is compared, in the transistor 11, with the reference voltage of the source 20. For a given value of the desired output voltage the proportion between the voltage across the resistor 19 and the total output voltage is chosen to be such that the current through the transistor 11 is just about to be interrupted at the limit of the stabilization range corresponding to the maximal output current. In this condition, the maximal current passes through the resistor 9 and a minimal current flows through the transistor 11. Furthermore, the arrangement functions in such manner that, within the control range, a decrease of the load current, that is to say an increase of the voltage between the terminals 25 and 26, involves a rise of the current derived via the transistor 11. This entails a decrease of the current of the base 3, which is attended by a drop of the output energy of the oscillator in accordance with the reduced energy consumed by the load 30, so that a substantially constant output voltage is obtained between the terminals 25 and 26.

The value, on which the output voltage is stabilized, can be adjusted by varying the part of the output voltage applied to the base 23, for example by modifying the ratio existing between the resistors 18 and 19 which may comprise a potentiometer.

The transistor 21 serves to match the circuit of the base 13 to the resistor 19. As a matter of fact, the transistor 11 has too low an input impedance to be connected directly to the voltage dividers 18 and 19, unless the ratio of the resistors 18, 19 be very high or resistances of very low values be used. A high ratio would involve a loss of sensitivity, while low values of the resistors would entail loss of output energy.

The transistor 21 is connected in such manner that the collector circuit is common to the input and output circuits, so that the input impedance of the circuit of the base 23 is high and the output impedance of the circuit of the emitter 22 is low. In this manner, the transistor 21 provides an impedance matching between the voltage dividers 18, 19 and the transistor 11.

The output voltage obtained by means of this circuit arrangement is limited by the permissible collector voltage of the transistor 1. If higher output voltages are desired, the transformer 6 may comprise a third winding by which the voltage across the winding 5 is stepped up. The rectifier 8 should be connected to this winding. Instead of this additional winding, the primary winding 5 of the transformer may act as a step-up auto-transformer.

Figure 2:
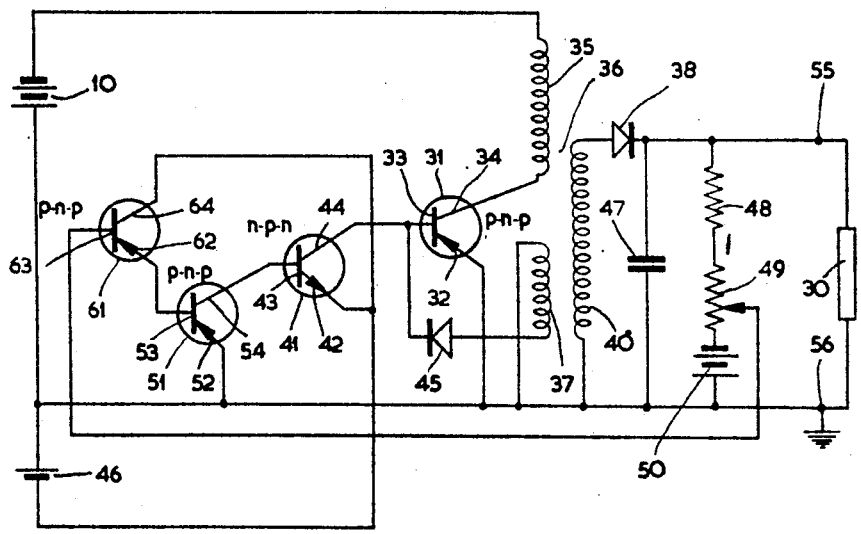
Fig. 2 is a modification of the embodiment of Fig. 1.

According to the modification shown in Fig. 2, a pnp type transistor 31 is connected as an oscillator. The emitter 32 and the positive terminal of the supply of, for example 3 volts, are connected to ground. The collector 34 is connected via a primary winding 35 of a transformer 36 to the negative terminal of the supply 10.

The base 33 of the transistor 31 is connected to ground by way of a rectifier 45 in series with a secondary winding 37 of the transformer 36. This base is also connected to the collector 44 of an npn type transistor 41. The emitter 42 of the transistor 41 is connected to the negative terminal of a supply 46, for example of 1.5 volts. Its base 43 is directly connected to the collector 54 of a pnp type transistor 51, the emitter 52 of which is grounded and the base 53 of which is connected to the emitter 62 of a pnp type transistor 61.

The collector 64 of transistor 61 is connected to the negative terminal of the supply 46, while the base 63 is connected to a sliding contact of a resistor 49 which is connected in series with a resistor 48 and with a reference voltage supply 50 between output terminals 55 and 56, the positive terminal of the supply 50 being grounded.

The transformer 36 comprises a second secondary winding 40, one end of which is grounded, while its other end is connected via a rectifier 38 to the terminal 55. A capacitor 47 is connected between the terminals 55 and 56 and serves to smooth the rectified voltage.

The operation of the oscillator is basically the same as that of the oscillator described with reference to Fig. 1. During the period of conductivity of the transistor 31 no current flows to its base through the rectifier 45, since during this time a voltage blocking the rectifier 45 is set up in the secondary winding 37. On account of the periodic interruption of the current through the primary winding 35 a high voltage is set up in the winding 40 so as to drive the anode of the rectifier 38 positive. This voltage is rectified by the rectifier 38 and supplies between terminals 55 and 56, a D. C. voltage exceeding the voltage of the supply 10.

This circuit arrangement also comprises means controlling the output energy of the oscillator in accordance with the load 30 so as to ensure a degree of voltage stabilization. Said means comprise the transistor 41, the collector 44 of which is connected to the base 33, so that the base current of transistor 31 can be altered by controlling the collector current of the transistor 41.

The transistor 41 is of the npn type, so that its collector current may directly serve as the base current of the transistor 31. The current of the base 43 is likewise identical with the current of the collector 54 of the transistor 51. The transistor 51 is controlled by the transistor 61 which is connected with a grounded collector, the base-emitter circuit of emitter circuit of transistor 51 being the load impedance of transistor 61. A part of the voltage across the potentiometer 49 is applied to the base 63.

The potential of the emitter 62 reaches substantially the same value as that of the base 63. Since the base 53 is connected to the emitter 62, said potential is compared with the potential of the emitter 52 (ground). The amplified current passing to the collector 54, and hence the current to the base 33, depends upon the result of said comparison. The part of the output voltage set up between the slider of the resistor 49 and the negative terminal of the reference source 50, is, in effect, compared within the transistor 51, to the reference voltage of the source 50. The arrangement is such that, within the control range, an increase in output voltage (for example due to a decrease in load current) involves a drop of the current passing through the transistor 41 to the base 33. This entails a decrease in output energy of the transistor 31 such that the voltage between the terminals 55 and 56 varies considerably less than it would if the transistors 41, 51 and 61 were not utilized.

The value at which the circuit arrangement tends to stabilize the output voltage, is adjustable by varying the part of the output voltage supplied to the base 63. The transistor 61 matches the impedance of the potentiometers 48, 49 to the input circuit of the transistor 51.

The current to be delivered by the supply 46 is very small. If desired, this supply may be used as a source of reference voltage, the end of the resistor 49 remote from the resistor 48 being connected to the negative terminal of the source 46.

In modifications (not shown) of the two arrangements so far described, the voltage applied to the base 23 of transistor 21 (Fig. 1) or to the base 63 of transistor 61 (Fig. 2) may be obtained either by means of an additional winding or of a tapping from an existing winding of the transformer 6 or 36 respectively, said voltage being rectified and smoothed before being applied to the base. Thus, the current loss through the resistors 18 and 19 and 48 and 49, respectively, is avoided.

In certain circumstances the transistor 21 or 61, respectively, may be dispensed with, the voltage obtained by means of the additional winding or of the transformer tapping and which would be applied to the base 23 or 63 respectively, then being applied to the base 13 and 53 respectively.

A restriction of the control range of the circuit arrangements shown in Figs. 1 and 2 is due to the fact that it is not possible to supply such a base current to a transistor as to render its collector current zero. This restriction is obviated by introducing a current of the correct sense into one or more of the collector circuits in order to compensate the irreducible part of the collector current.

For example, in the circuit arrangement shown in Fig. 2, a resistor may be connected between the collector 44 and the negative terminal of the supply 10 in order to bleed away said irreducible part of the collector current.

Figure 3:
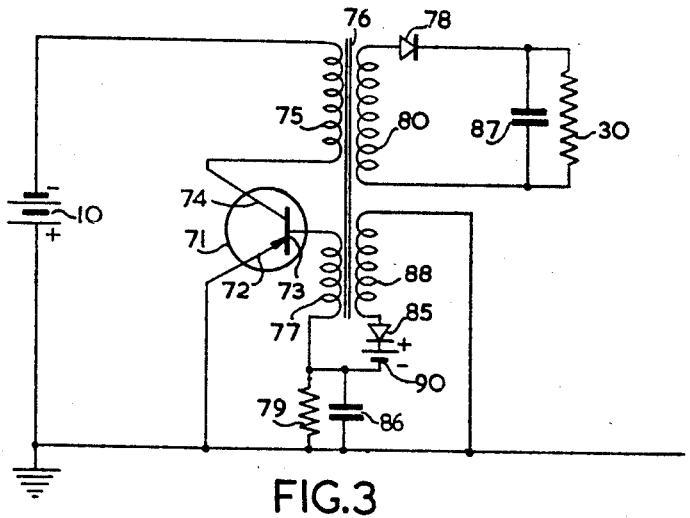
Fig. 3 is a schematic diagram of another embodiment of the circuit arrangement of the present invention.

The embodiment shown in Fig. 3 comprises a pnp type transistor 71, the emitter 72 of which is connected to the positive grounded terminal of a supply 10 of, for example, 3 volts. The collector 74 of transistor 71 is connected through a primary winding 75 of a transformer 76 to the negative terminal of the supply 10. The base 73 is grounded by way of a secondary winding 77 of the transformer 76 and of a RC network connected in series therewith. Said network comprises a resistor 79 connected in parallel with a capacitor 86 and has a predetermined time constant. The transformer 76 comprises another secondary winding 80 which is connected through a rectifier 78 to the terminals of a smoothing capacitor 87. A load 30 is connected in parallel with said capacitor. The transformer 76 comprises a third secondary winding 88, the ends of which are respectively connected to ground and through a rectifier 85 and a source of reference voltage 90 to the RC network 79, 86.

The operation of the oscillator corresponds basically to that of the oscillator described with reference to Fig. 1. Without the winding 88 and the associated parts, the voltage across the load 30 would depend upon the value of said load. Stabilization of the voltage across the load 30 is achieved by deriving the voltage from the winding 88 and comparing it by means of the rectifier 85 with the voltage of the reference source 90. Thus, if the voltage across the winding 88 exceeds that of the reference source 90, a current flows through the RC network 79, 86. This results in producing a bias voltage for the base 73, so that the current through the transistor 71 is interrupted at a lower value of its collector current. As a result thereof, less energy is derived from the supply 10, so that the output voltage across the load 30 is likewise reduced. Evidently any attempt of the voltage across the load 30 to increase beyond a threshold value determined by the reference voltage is counteracted by the base bias produced. This circuit arrangement is effective both against load voltage variations brought about by load variations and against such variations caused by supply voltage variations.

The reference voltage source 90 may be replaced by a so-called reference diode, for example a germanium diode connected in the blocking direction, the current versus voltage characteristic of which displays a threshold beyond which the current increases rapidly for a small voltage increase, on account of the Zener effect.

Figure 4:
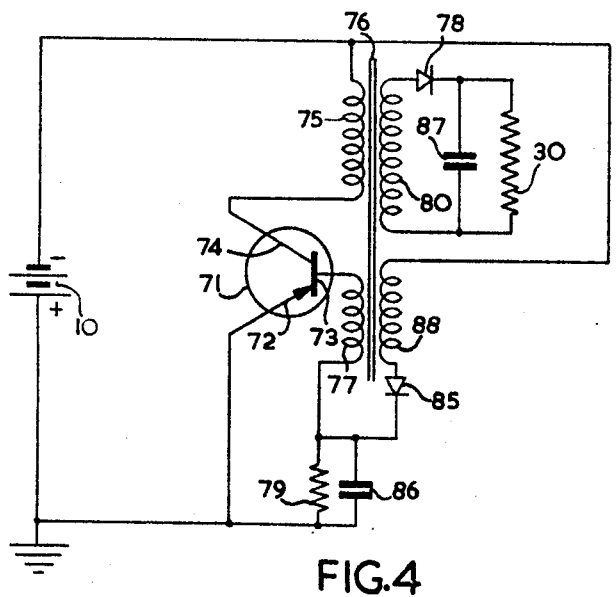
Fig. 4 is a modification of the embodiment of Fig. 3.

In the variant shown in Fig. 4, the supply 10 is used simultaneously as a source of reference voltage. Of course, this circuit arrangement does not permit stabilization of the output voltage with respect to supply voltage variations. In Figs. 3 and 4, corresponding parts are provided with the same reference numerals. In Fig. 4, one end of the winding 88 is connected through the rectifier 85 to the RC network 79, 86. The other end of the winding 88 is connected to the negative terminal of the supply 10.

The circuit arrangement operates substantially similarly to that shown in Fig. 3, except that the voltage across the winding 88 now has to exceed the voltage of the supply 10 before a current flows to the RC network 79, 86, and hence before a bias for the base 73 is produced.

The circuit arrangements referred to may also be used to safeguard the parts and particularly their oscillator transistor against voltage surges which might occur in the eventuality that their load circuit is interrupted. In certain circumstances, for example if the load resistance and the supply voltage are substantially constant and the current consumption should be maintained as low as possible, no current should flow through the rectifier 15 (Fig. 1), 45 (Fig. 2) or 85 (Figs. 3 and 4) during normal operation. In this case the threshold voltage of the stabilization arrangement is chosen so high as to prevent operation of the stabilization device with normal loads of the circuit arrangement. This can be achieved by suitably proportioning the voltage dividers 18, 19 (Fig. 1), or 48, 49 (Fig. 2), or the winding 88 (Figs. 3 and 4). If the load circuit of the circuit arrangement becomes interrupted, the D. C. output voltage and the amplitude of the oscillator oscillations increase. However, this increase is limited by the stabilization device. As soon as the output voltage attains said threshold value, stabilization occurs and the oscillator-transistor is biased so as to reduce the energy taken from the supply 10.

The aforesaid circuit arrangements may alternatively be employed as amplifiers. If the reference voltage is altered in accordance with a signal to be amplified, the output voltage also varies in accordance with said signal and with a larger amplitude. The signal to be amplified may be superimposed on the reference voltage, for example by means of a transformer, the primary winding of which is connected to the signal source and the secondary winding of which is connected in series with the reference voltage circuit.

In the aforesaid circuit arrangements pnp type transistors may be substituted for npn type transistors, and conversely, provided the required reversals of polarity of the voltages, rectifiers and so on be effected.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement for converting a lower D. C. voltage into a higher D. C. voltage by means of a transistor-oscillator, comprising a rectifying and filtering means for rectifying the oscillator-oscillations, characterized in that the rectified oscillator-oscillations, after comparison with a reference voltage, control the base current of the transistor so as to establish a predetermined relationship between said rectified oscilations and the reference voltage.

2. A circuit arrangement as claimed in claim 1, characterized in that the reference voltage is constant so that the rectified voltage is stabilized to a considerable degree.

3. A circuit arrangement as claimed in claim 1, characterized in that the oscillator is a relaxation oscillator.

4. A circuit arrangement as claimed in claim 3, characterized in that a shunt controlled by the reference voltage is connected in parallel with the base-emitter input circuit of the oscillator-transistor.

5. A circuit arrangement as claimed in claim 1, characterized by a potentiometer serving to derive a voltage proportional to the rectified voltage and which is followed by a transistor stage in grounded collector connection.

6. A circuit arrangement as claimed in claim 1, characterized in that the base current of the oscillator-transistor is only controlled when the rectified output voltage and the amplitude of the oscillator-oscillations reach a predetermined value, said base current being then controlled so as to limit the increase of said voltages beyond said value.

7. A circuit arrangement as claimed in claim 1, in which the reference voltage is variable, characterized in that the produced rectified voltage varies in accordance with said variable voltage and with an amplified amplitude.

8. A circuit arrangement as claimed in claim 2, in which the emitter of the oscillator transistor is connected to a first terminal of the source of supply voltage, the collector is connected via the primary winding of the transformer to the other terminal of the source of supply voltage, and the base of the oscillator-transistor is connected to the emitter via a secondary winding of said transformer and through a series-connected resistor, characterized in that the transformer comprises a second secondary winding, and in that a rectifier connected thereto and which supplies a voltage proportional to the rectified output voltage, supplies a control signal obtained by comparing said voltage with the reference voltage, said control signal being applied as a bias voltage to the base of the oscillator-transistor so as to reduce considerably the variations of the D. C. output voltage.

9. A circuit arrangement as claimed in claim 8, characterized in that a source of reference voltage and the series resistor of the base circuit of the oscillator-transistor are connected in series with the second secondary winding of the transformer and with its associated rectifier, so that the rectifier compares the voltage across the second secondary winding of the transformer with the reference voltage and produces a corresponding bias voltage across said resistor.

10. A circuit arrangement as claimed in claim 9, characterized in that the source of D. C. supply voltage delivers the reference voltage, the D. C. output voltage being stabilized in relation to load resistance variations.

11. A circuit arrangement as claimed in claim 9, characterized in that the reference voltage is supplied by a separate source of constant voltage, so that the D. C. output voltage is stabilized in relation to load resistance variations and/or variations of the supply voltage.

No references cited.